Nov. 23, 1965 V. F. ZAHODIAKIN 3,219,086
RELEASABLY SECURED MOUNTING MECHANISM
Filed May 3, 1963 2 Sheets-Sheet 1
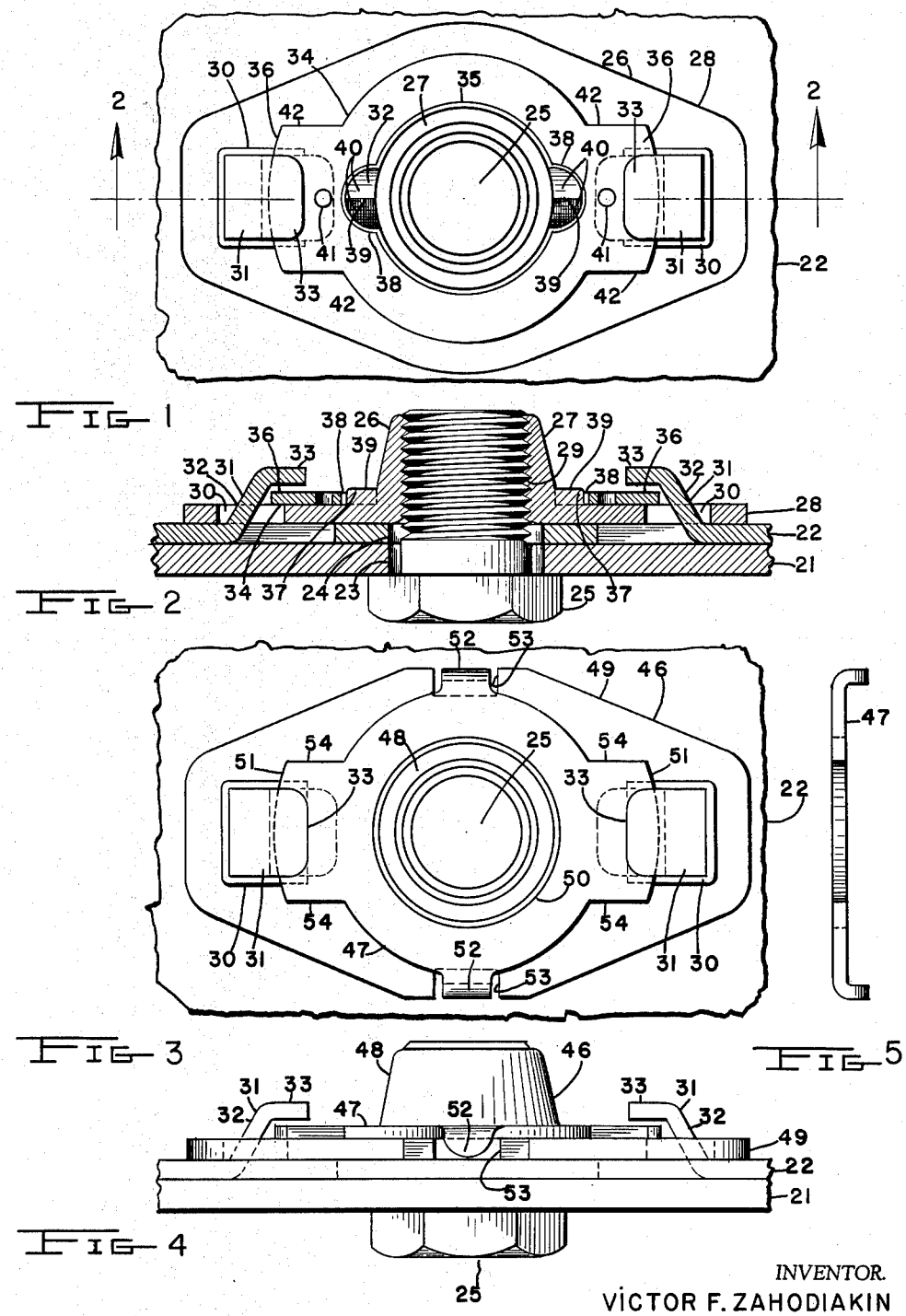
INVENTOR.
VICTOR F. ZAHODIAKIN
BY
Howard P. King
ATTORNEY Nov. 23, 1965 V. F. ZAHODIAKIN 3,219,086
RELEASABLY SECURED MOUNTING MECHANISM
Filed May 3, 1963 2 Sheets-Sheet 2

INVENTOR.
VICTOR F. ZAHODIAKIN
BY
Howard P. King
ATTORNEY

United States Patent Office 3,219,086
Patented Nov. 23, 1965

3,219,086
RELEASABLY SECURED MOUNTING
MECHANISM
Victor F. Zahodiakin, P.O. Box 689, Summit, N.J.
Filed May 3, 1963, Ser. No. 277,935
8 Claims. (Cl. 151—41.7)

This invention relates to releasably secured mounting mechanisms having a variety of utilitarian purposes such as for receiving a bolt or the like to function therewith as a nut, or to provide a socket for reception of, as one example, a flag staff, or to function as a mount for curtain rods, and for various other purposes too numerous to catalog herein. For purposes of this disclosure, the mechanism is arbitrarily illustrated in performing the function of receiving a bolt by which two panels are clamped together, and in this capacity the invention may be advantageously used in performance of the duty of a nut for detachable application to aircraft in the multitudinous requirements encountered in the assembly of the aircraft and in securing various accessories in place. For brevity, the following description will be directed to the last-mentioned use and the arbitrarily selected embodiment herein illustrated but without restricting the invention only thereto.

In its general aspect, the invention proposes a releasably secured mounting mechanism which may be attached in its operative location figuratively by a simple twist of the wrist.

Conversely, the invention proposes a construction wherein removal of the mechanism may be readily and effectively accomplished without damage to itself or to the body on which it was mounted.

Furthermore, notwithstanding the ease of application and removal of the device of this invention to and from a body or member, an important consideration is accomplishment of certainty against inadvertent release of said device from its position of use.

Another general object of the invention is to provide a mechanism adaptable for use where space is limited or where protrusion from the supporting surface has to be restricted.

A feature of the invention is to provide a structure of such nature that any mechanic will immediately understand either the mode of attachment or release of the mechanism and requires no special training or involved manipulations in performing the attaching and releasing operations.

As a corollary to the foregoing object, the invention seeks and attains a simple and readily operable construction both economical in manufacture and use not only on initial installation but also when repeated removal and/or substitution are required.

Somewhat more in detail, the invention provides a minimum of removable parts, of which one is a resilient lock that can be snapped into locking position and automatically deflected and released by manual application of rotative force by an operator.

Finally it may be said that the invention includes provision of a tool by which the resilient lock may be operated both to rotate the lock to locked position and to unlocked condition.

Other objects, advantages and beneficial structural features will appear to persons skilled in the art to which the invention appertains, as the description proceeds, both by direct recitation thereof and by implication from the context.

The novel features that I consider characteristic of my invention are set forth in the appended claims. The invention itself, however, as to its construction and its methods of operation, together with additional objects and advantages, will be best understood from the following description of certain specific embodiments when read in conjunction with the accompanying drawings, in which:

FIGURE 1 is a plan of the invention in position of use on a panel or body member;

FIGURE 2 is a longitudinal sectional view taken on line 2—2 of FIG. 1;

FIGURE 3 is another plan view showing a modified construction of the invention;

FIGURE 4 is a longitudinal edge view which may be conveniently referred to as a front elevation of FIG. 3;

FIGURE 5 is an end edge view of the resilient lock utilized in the construction of FIGS. 3 and 4;

Figure 7:
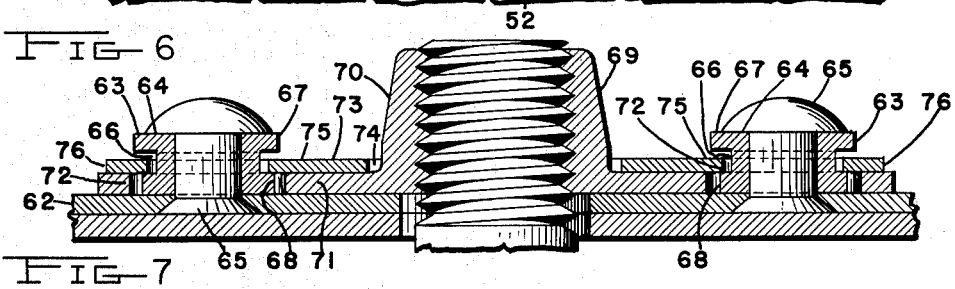
FIGURE 7 is a longitudinal sectional view taken on line 7—7 of FIG. 6.
Figure 8:
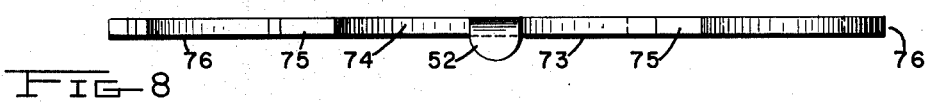
FIGURE 8 is a longitudinal edge view or front elevation of the resilient lock of FIGS. 6 and 7.
Figures 9, 11:
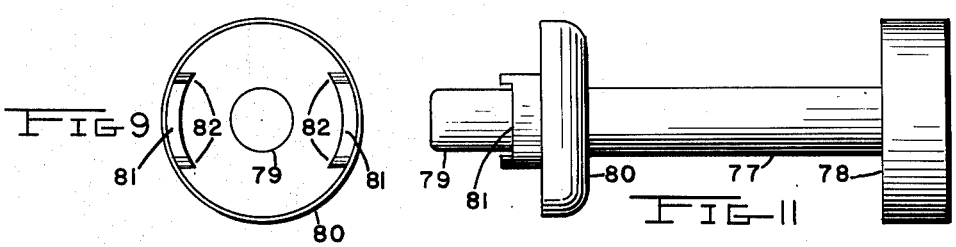
Figures 10, 12:
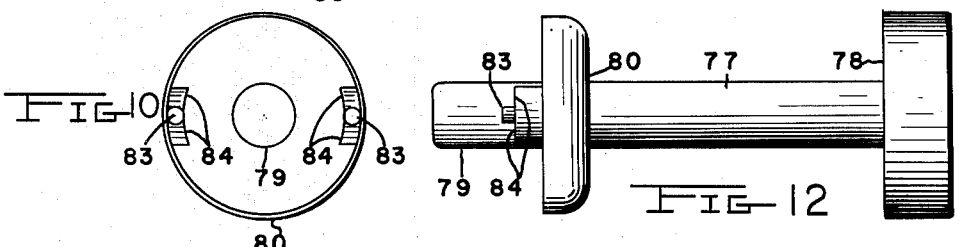

FIGURES 9 and 11 are respectively an end view and a longitudinal elevational view, on a reduced scale from preceding figures, of a key or tool for manipulating the locks shown in FIGS. 3 to 8 inclusive; and FIGURES 10 and 12, also on reduced scale, are respectively an end view and a longitudinal elevational view of a key or tool for manipulating the lock shown in FIGS. 1 and 2.

In the specific embodiment of the invention illustrated in said drawings for its use as a clamping mechanism, two panels or members 21, 22 are shown positioned flatwise together, having registering holes 23, 24 respectively through which the shank of a bolt 25 passes, and in the particular orientation here selected, the head of the bolt engages against the lower member 21 and the shank protrudes upwardly through the upper member 22. As indicated above, this is an arbitrarily selected showing of one use for the invention, and is not to be understood as restrictive.

In any event, the invention provides an element designated generally as a receptacle 26 which is constituted as a hub or socket portion 27 at the lower end of which and integral therewith, is provided a radially projecting flange 28 having a flat under surface adapted to rest upon and be retained removably in stable flatwise engagement upon the upper face of upper member 22 which in one form or another is always present even though in some uses of the mechanism the lower member 21 may not be required or be present. Since it is this upper member 22 upon which the receptacle is removably mounted, it will be designated in its individual character hereinafter by the more general term of basal member 22 so as to avoid any implication that the lower member 21 must be present for all uses to which the invention is applicable. In the precise showing of the use of the mechanism herein arbitrarily illustrated, however, both members are present and said hub or socket member 27 is screw threaded internally at 29 for reception of and cooperation with the threaded bolt 25, thereby utilizing the device for clamping the members tightly together.

Generally considered, the flange 28 of receptacle 26 is of elongated character so as to project in opposite radial directions considerable distances from two opposite sides of the socket portion or hub 27 and lesser distances from intervening sides of the hub. Proximate to the long ends of said flange 28 cut-outs or ports 30 are provided therethrough, said ports being here indicated as rectangular as viewed in plan and equally spaced from the center of socket portion or hub 27 at a considerable distance therefrom, and diametrically opposed to each other on opposite sides of said hub.

Basal member 22 has two retainers 31 with a spacing from each other in conformity to the position and spacing of the flange ports 30 so that in use the said retainers may project through said ports when applying the flange to its flatwise relation on said member and during subsequent condition of assembly thereof. Considering the retainer construction in greater detail as it appears in FIGS. 1–4, one mode of providing the retainers is to strike them up as tabs of the full thickness of the plate or member material, with the base of such tabs or retainers integral with the member and forming inclined risers 32 sloping upwardly at less than 90° from the member and inwardly toward each other, say at an angle of about 60° to the face of said member. The upper or free ends of said risers are again bent less than 90°, in this instance at about 60° from the plane of the riser, into substantial parallelism to the plate or member to form at their under sides downwardly directed shoulders 33 at an elevation from the upper face of said member greater than the thickness of said flange 28 so as to admit a margin of the flange port 30 thereunder and at a distance therebelow.

It should be noted that in forming the risers 32 and shoulders 33 by angular bends of the struck-up material, the degree of angularity is an important factor since some types of high strength aluminum sheets used on aircraft, and for other applications, are not sufficiently ductile to withstand excessive bending, and readily fracture when bent as much as 90° or more. Bends shown in the drawings, for the retainers 31 as struck up from the basal member 22, can be produced by a single stroke of punch and die without fracture. The bends herein employed, therefore must be less than 90° and the 60° bend from original plane of the metal at place of bending has been found ideal to provide minimum length and maximum strength of retainers and confines the over-all longitudinal dimension of the device, inclusive of the retainers, to a relatively small size. The distance between the inward edges of the opposed shoulders 33 on relation to the size and spacing of the ports 30 in the flange, thickness of the flange 28 and slope of the risers 32, are all properly proportioned and related to enable the flange to be assembled on said retainer 31 and member 22.

In practice, one port 30 is applied onto its respective retainer 31 with the flange 28 tilted upwardly toward its other end above the retainer thereat. Then the flange is slid as far as it will go under the inclined riser 32 of the first retainer, which will be just sufficient to permit the shoulder 33 of the other retainer to pass into the contiguous port 39 so the flange can then sink to flatwise engagement with the upper surface of plate or member 22. Centralizing the flange will then result in both shoulders 33 overlying margins of the respective ports 30. Side edges of the retainers 31 are in close proximity to the side edges of ports 30 and any material rotation of the flange 28 and its hub 27 will be prevented.

A lock is provided to keep the flange 28 from escape from its assembled position under the retainer shoulders 33. Such a lock, designated by numeral 34 in FIGS. 1 and 2, is fabricated from relatively thin spring sheet steel tempered to generate and maintain resiliency. It has a generally ring-shaped configuration so as to be readily applied to and encircle the receptacle hub 27 and lie flatwise on top of flange 28, and consequently is formed with a central hole 35 larger than the hub. The generally circular periphery of said lock 34 has a diameter less than the distance between the inwardly directed edges of the retainer shoulders 33. At diametrically opposite sides of the circular portion of the lock and projecting outwardly therefrom in the same plane therewith, are wide ears or hasps 36 the remote outward edges whereof are preferably arcuate on a common center concentric with the hub-receiving central hole 35. The diameter from said remote edge of one hasp to the remote edge of the other hasp is greater than the distance between the inwardly directed edges of the pair of shoulders 33 above described. Consequently when the hasps 36 are rotated on the upper face of the receptacle flange 28, they may be brought to a position underlying said shoulders 33 and thereby prevent the flange from rising materially from its flatwise location on basal plate or member 22 and likewise prevent escape of the flange 28 from the pair of retainers 31.

The invention furthermore includes provision of means restraining the lock from leaving its locking position except when impelled manually. In all showings herein, a restraining means is provided which necessitates flexing the lock from its normal retained condition to an abnormal condition of flexure in order to permit the lock to be rotated out of engagement from under the retainer shoulders.

The specific restraining means depicted in FIGS. 1 and 2, provides at least one detent 37 integral with both the hub 27 and flange 28 at the juncture therebetween. Viewed in plan, the detent 37 is shown as a semicircular lobe projecting from a side of the hub 27 at the top of flange 28. A corresponding semicircular notch 38 into which the detent 37 may engage, is provided as an interruption of the periphery of the central hole 35 of the lock 34. The detent 37 is formed with a central ridge 39 at its top, said ridge extending radially of the detent 37 common with an extended radius of the hub 27. From said ridge 39, in both directions, the top areas of the detent slope downwardly toward the flange surface, these top areas constituting cam surfaces 40 in one or the other of which the lock 34 may be manually forced, flexing said lock 34 to abnormal condition, and releasing the notch 38 from detention by the detent 37. By the use of a plurality, namely, in this instance, two symmetrically disposed detents 37 and notches 38, and a normally flat resilient lock 34, assembly and use are simplified greatly since the lock may be applied either side up and may be rotated either clockwise or counter-clockwise for both locking and unlocking the same. A suitable key, subsequently described, may be provided for rotating the lock, and for use with a key intended for pin-engagement with the lock, an appropriate hole 41 may be provided in the lock midway between the side edges 42 of the ears or hasps 36 and proximate to the notches 38.

Considering now the modified construction of FIGS. 3–5, lower member 21 and upper or basal member or plate 22 are again shown, together with a bolt 25 functioning, when used, as heretofore described. The basal member 22 again has retainers 31 struck up therefrom, said retainers having sloping risers 32 which terminate as shoulders 33 parallel to the said member or plate and with their free ends in adequate spaced relation from each other and from the member to admit introduction of a modified receptacle 46 and lock 47 more fully described in part in the following description supplementing description hereinabove.

The receptacle 46, like in the previously described receptacle 26, provides an internally threaded hub or socket portion 48 at the lower end of which and integral therewith, is provided a radially projecting flange 49 having a flat under surface adapted to rest upon and be retained removably in stable flatwise engagement with and upon the upper face of said basal member 22. Said flange is of elongated character so as to project in opposite radial directions beyond the retainers 31 and is shown with rectangular cut-outs or ports 30 for reception of said retainers in the same manner as previously described for the retainers and ports of FIGS. 1 and 2.

The lock 47 illustrated in FIGS. 3–5 is provided to keep the flange 49 from escape inadvertently from its assembled position under the shoulders 33 of retainers 31. Said lock 47 is fabricated from relatively thin spring steel tempered to generate and maintain resiliency. It is of general shape of a ring, thereby having a central hole 50, said hole being larger than hub 48 and may be applied therearound and with the ring-shaped lock engaging flatwise against flange 49. Said lock has two ears or hasps 51 projecting therefrom in a common plane therewith and at diametrically opposite sides thereof. While the general diameter of the ring-shape of the lock is less than the distance between the inwardly directed edges of the shoulders 33, the spread of said ears or hasps 51 is adequate to enable the same to be rotated into underlying relation to said shoulders, and in that position will prevent the flange from rising materially from its flatwise location on basal member 22 and likewise prevent escape of the flange from the pair of retainers 31.

The specific means depicted in FIGS. 3–5 for restraining the lock from inadvertent rotation, comprises downwardly bent lobes 52 at the periphery of the lock 47 at diametrically opposite locations midway between the ears or hasps 51. The flange 49 is provided with notches 53 into which the said lobes will enter when the lock assumes a position of its ears or hasps 51 registering with the retainer shoulders 33. The bottoms of said lobes are arcuate, and consequently an operator may forcefully rotate the lock causing the lobes to ride out of said notches by virtue of flexing of the lock. When one side edge 54 of each ear or hasp 51 is revolved far enough to clear the retainer shoulder 33, the lock is fully released and returns to its generally flat condition. A suitable key, subsequently described, may be provided for rotating the lock both to and from its locking position.

Figure 6:
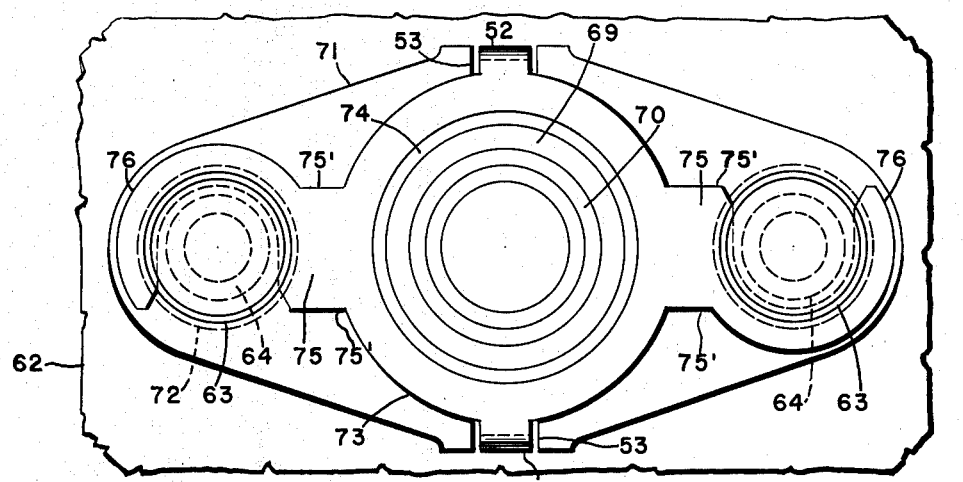
FIGURE 6 is a plan corresponding to FIG. 3, but showing a different mode of retention from twisting and a different form of lock therefor.

Giving attention now to the construction shown in FIGS. 6–8, an upper or basal member or plate 62 may be employed having retainers differing in structure but serving the same purpose as the retainers previously described, but having the same relative locations. Each retainer 63 comprises a sleeve 64 and a rivet 65 extending through the sleeve and mounting it permanently in endwise engagement against said basal member or plate 62. The upper end portion of said sleeve 64 is peripherally of greater diameter than the lower end portion thereof, and intermediate of said end portions is a peripheral groove 66 in consequence of which the larger upper end portion constitutes a peripheral shoulder 67 forming the upper annular wall of said groove, and the smaller lower end portion of the sleeve provides a seat 68 forming the bottom annular wall of said groove.

This modification of the invention of FIGS. 6–8 also provides a receptacle 69 constituted with an internally threaded hub 70 at the lower end of which and integral therewith is a radially projecting flange 71 having a flat under surface adapted to rest upon and be retained removably in flatwise engagement with and upon the upper face of basal member or plate 62. Said flange is of elongated character so as to project in opposite radial directions from the hub 70 toward and beyond said retainers 63 and is provided with ports 72, here shown as circular, through which said retainers may project. Preferably the said ports conform to the peripheral contour of the upper larger end portions of the retainer sleeves 64 with only adequate clearance for insertion of the retainers through said ports 72. Also the thickness of the flange 71 and height of the seat portion 68 of the sleeve are equal to each other so the top face of the flange and top of said seat will be in a common plane. It will be observed that since the seat portion of the retainer sleeve 64 has less diameter than the shoulder portion, there is increased clearance of the flange port 72 around the seat portion of the retainer sleeve 64 thereat, affording a so-called "floating" mounting for the receptacle so that the receptacle may adjust itself to coaxial reception of a bolt 73 sought to be screwed into the hub.

A lock 73 is provided for and shown in the example of the invention of FIGS. 6–8, having the purposes of both interlocking with the retainers 63 and preventing the receptacle from escape inadvertently. As in the previously described instances, the lock is fabricated from relatively thin sheet spring steel tempered to generate and maintain resiliency and is of general shape of a ring with a central hole 74 of larger diameter than the hub 70 so it may be applied there around and flatwise against the flange 71. Two diametrically opposite ears or hasps 75 project in a common plane from the ring portion of the lock, said ears terminating at their remote ends as hooks or latches 76. Said latches 76 are located at proper distances from each other and from the center of the ring to hook into the grooves 66 of the retainers 63, and are shown at opposite sides of the ears 75 so that upon rotating the lock 73 counter-clockwise according to the arrangement shown, both hooks simultaneously engage in the respective retainer grooves. The ears 75 have side edges 75′ extending from the ring to said hooks.

Means for restraining the lock of FIGS. 6–8 from inadvertent releasing rotation, similar to the means described with respect to FIGS. 3–5, may be provided. It may accordingly again be said that the means comprises downwardly bent lobes 52 at the periphery of the circular part of lock 73 at diametrically opposite locations midway between the ears 75 with the bottom edges of the lobes arcuate. The flange 71 is provided with notches 53 properly located to receive the lobes 52 when the lock is in its position of interengagement of the hooks 76 in the grooves 66 of the retainer sleeve 64, but capable of being forced out of said notches with an accompanying flexure of the lock when appropriate clockwise rotation is applied to the lock by an operator.

It is feasible for an operator to unlock the various resilient locks of the several disclosures herein by applying a rotative force against an appropriate side edge of any one of the ears 36, 51 or 75 herein shown. Such rotation is, however, more readily effected by a simple tool made for the purpose, such as shown in FIGS. 9 and 11. (It should be noted here that the scale of drawing of the tool is smaller, approximately one half, the scale of drawing of the devices shown in the preceding figures.) The tool is shown as providing a shank 77 of convenient length with a hand-grip 78 at one end and terminating at its other end as a cylindrical pintle 79 of appropriate diameter and length to readily slide into and be rotatable in the hub socket. At the end of the pintle toward the hand grip there is a cross-head 80 fixed with respect to the shank. Said cross-head has a diameter commensurate with the distance of the ears of the lock from each other, and next to the periphery of said cross-head and fixed with respect thereto, are lands 81 having a span sufficient to lie entirely across the lock ears from side to side thereof, and at the ends of the lands there are prongs 82 which will engage at the said side edges to enable the tool to rotate the lock when the tool is twisted. The lands constitute means for depressing the lock ears to obtain engagement thereof under the retainer shoulders during the operation of locking the lock. As there are prongs 82 at both ends of the lands 81, the tool will function to both lock the lock and to unlock it, depending upon which operation is required.

The above-described tool will function with respect to any of the locks shown in the drawings. If however, the lock is provided with key-engaging holes, as shown at 41 in FIGS. 1 and 2, the key may be made with a pin or pins 83 each here shown midway of a land 84 as shown in FIGS. 10 and 12, for engagement in that hole, so the pin will function to rotate the lock in either direction. Except for substitution of the pin 83 at the center of lands 84 in place of the two prongs 82 at the ends of land 81, the key of FIGS. 10 and 12 is otherwise identical with the key of FIGS. 9 and 11 and duplication of description is not deemed necessary.

Finally, it may be observed that all forms shown of the invention permit limited sliding movement of the receptacle on the basal member or plate, giving to the receptacle a "floating" characteristic. Likewise in all of the showings, the receptacle is releasably mounted and its removal may be readily effected without complicated or injurious operations, and the receptacle, or a substitute, may be quickly and readily returned in place in secured position. It further should be noted that the retainers 31 and 63 are adapted to receive the torque during operation of the device as well as to prevent axial displacement.

I claim:

1. A mechanism of the character described comprising in part a detachable device and in part a mounting body having a face engageable by said device, said body having retainers projecting in fixed position from said face for engaging said detachable device, and said device incorporating a receptacle having an axis adapted to be disposed transverse to said body face, said receptacle comprising a hub and an elongated flange integral therewith and said flange being provided at the elongation thereof with ports engageable with said retainers, said retainers providing resistance to operating torque in either direction tending to rotatively displace said receptacle, and a sheet metal lock of generally flat configuration in its entirety concentric to and on said receptacle in juxtaposition to said flange and having portions adapted to interlock with said retainers, said lock tending to normally maintain its generally flat condition and being in such flat condition when in juxtaposed engagement with said receptacle flange and with said lock portions interlocking with said retainers as well as when fully released therefrom, said lock adapted to be momentarily resiliently flexed outwardly from the flange from its flat condition in final approach to and initial departure from its locking position, and cooperative projection and recess interlocking means provided by and between said receptacle and lock for releasably locking said lock and for obtaining said flexing of the lock by forceful rotation of said lock, wherein the recess receives said projection at locking position of said lock, one at least of said recess and projection having a slope in direction of rotation of said lock by which the lock is flexed and lifted to the height of said projection when rotated in said final approach to and initial departure from locking position.

2. A mechanism in accordance with claim 1, wherein said means comprises a pair of cams projecting in the path of rotation of said lock at the juncture of said hub and flange, and a corresponding pair of recesses are provided in the lock in the path of rotation by which the recesses will register with and receive said cams therein.

3. A mechanism in accordance with claim 1, wherein said means comprises a pair of cams at diametrically opposed outer edges of said lock, said cams being directed toward the flange and adapted to ride thereon, and a corresponding pair of recesses outwardly of the flange at a location in the path of rotation of said cams to receive said cams therein.

4. A device in accordance with claim 1, wherein said means comprising a pair of cams at the junction of the hub and flange, said cams having semi-circular configuration outwardly from said hub and having progressive projection away from the flange in an axial direction at the side of the hub, and said recesses formed as a corresponding pair of semi-circular notches in the lock, said lock having a central opening receiving said hub therethrough and said notches extending radially outwardly from said opening and each having a size and location commensurate with a respective said cam for receiving the cam therein and permitting the lock to lie flat and the cam to retain the lock from rotation until forced to flex upwardly over said cam by forceful rotation of the lock.

5. A device in accordance with claim 1, wherein said means comprises a pair of cams with semi-circular edges directed toward the flange and located at the outer edge of said lock medially of the length of said lock, said semi-cular edges adapted to ride on said flange when the lock is rotated, and a corresponding pair of recesses outwardly of the flange at a location in the path of rotation of said cams to receive said cams therein for interlocking the lock with said receptacle.

6. A device in accordance with claim 5, wherein said retainers have grooves offset above said mounting body a distance at least as far as the thickness of the flange, and wherein said lock has its ends laterally hooked in corresponding direction of rotation of the lock, the said ends thereby hooking into said grooves of the retainers and preventing axial displacement of the receptacle from said mounting body.

7. A mechanism of the character described comprising in part a detachable device and in part a mounting body having a face engageable by said device, said body having retainers projecting in fixed positions from and integral with said body, said retainers having risers sloping approximately 60° from said face and having shoulders integral with and projecting from said risers for overlying a portion of said detachable device, and said device incorporating a receptacle having an axis adapted to be disposed transverse to said body face, said receptacle having a flange provided with rectilinear ports two sides of each of which are engageable with sides of said risers projecting through the respective ports, and a resilient sheet-steel resilient lock concentric to and on said receptacle and having arcuate ends movable by rotation of the lock into releasable interlocking engagement under said shoulders to prevent axial displacement of said receptacle from said body, and said flange having notches at its sides remote from said ports and said lock having lobes adapted to seat in said notches for restraining the lock from rotating on said receptacle, said lock being substantially planar with only the lobes projecting out of said plane.

8. A mechanism of the character described comprising in part a detachable device and in part a mounting body having a face engageable by said device, said body having retainers projecting in fixed positions from said body, said retainers comprising sleeves axially perpendicular to said face and having shoulders directed toward said face, rivets securing said sleeves to said body, and said device incorporating a receptacle having an axis adapted to be disposed transverse to said body face, said receptacle having a flange adapted to be juxtaposed on said body face, said flange provided with circular ports engageable on said sleeves, and a resilient sheet-steel resilient lock concentric to and on said receptacle, said lock having hooks at ends thereof movable by rotation of the lock into interlocking engagement with said shoulders to prevent axial displacement of said receptacle from said body, said flange having notches at its sides remote from said ports, and said lock having lobes adapted to seat in said notches for restraining the lock from rotating on said receptacle.

References Cited by the Examiner

UNITED STATES PATENTS

| 1,800,176 | 4/1931 | Carr | 151—41.75 |
| 2,144,553 | 1/1939 | Simmonds | 151—41.76 |
| 2,234,557 | 3/1941 | Hungerford | 151—41.7 |
| 3,036,673 | 5/1962 | Santerre | 151—41.75 |

FOREIGN PATENTS

| 729,521 | 12/1942 | Germany. |
| 530,474 | 12/1940 | Great Britain. |
| 658,776 | 10/1951 | Great Britain. |

EDWARD C. ALLEN, *Primary Examiner.*